WIRE STRAIGHTENER

INVENTOR.
ROBERT C. SHAMBELAN
BY
Morris A. Rabkin
Attorney

WIRE STRAIGHTENER

Filed Aug. 11, 1964 3 Sheets-Sheet 2

INVENTOR.
ROBERT C. SHAMBELAN
BY
Morris A. Rabkin
Attorney

INVENTOR.
ROBERT C. SHAMBELAN
BY
Morris A. Rabkin
Attorney

United States Patent Office 3,319,668
Patented May 16, 1967

3,319,668
WIRE STRAIGHTENER

Robert C. Shambelan, Somerville, N.J., assignor to Radio Corporation of America, a corporation of Delaware Filed Aug. 11, 1964, Ser. No. 388,830
9 Claims. (Cl. 140—147)

Figure 1:
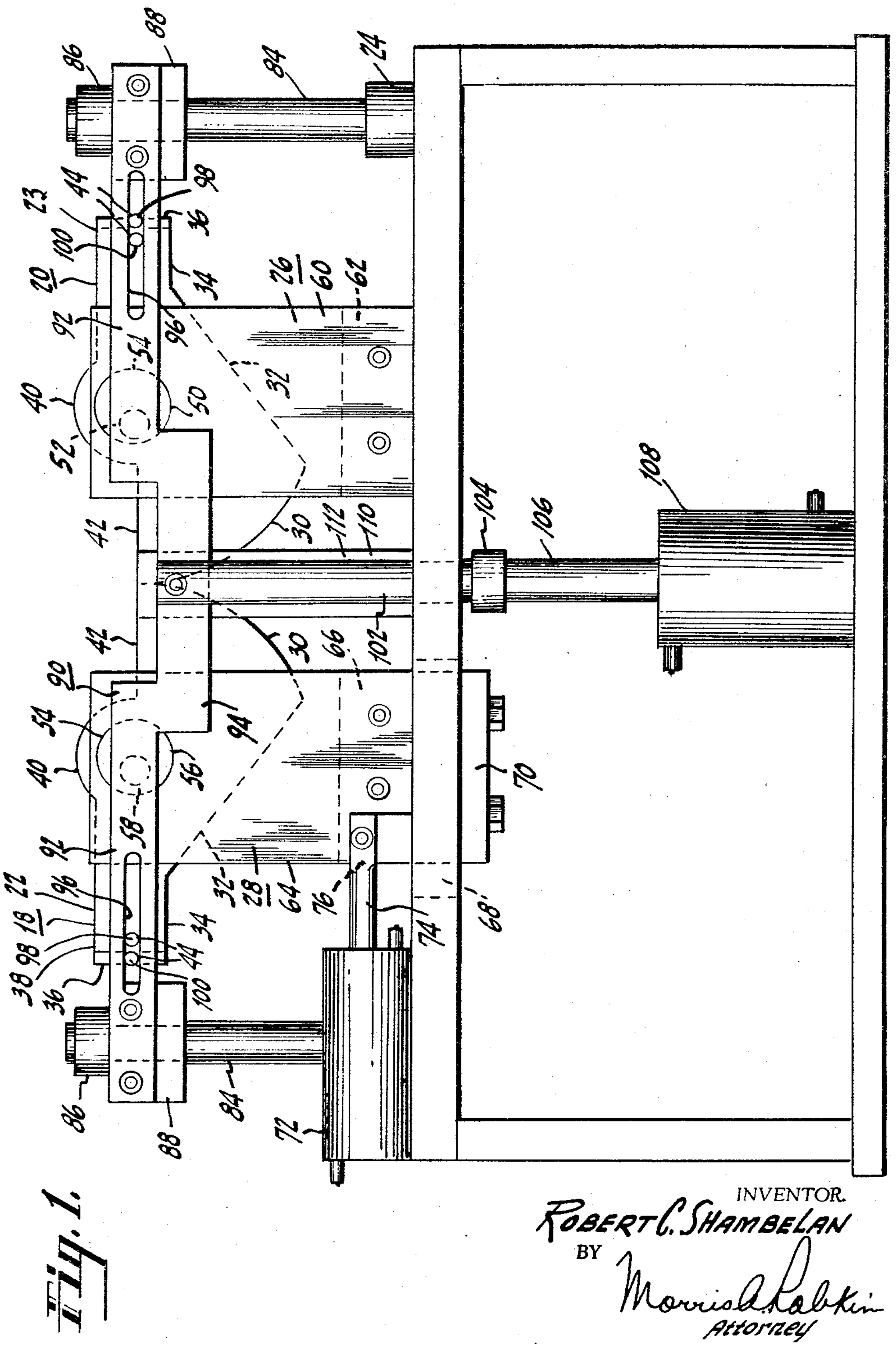

This invention relates to a wire straightener, and particularly to a straightener adapted to straighten bent wire leads of transistors.

In the production of a transistor, a multitude of handling and testing operations are required. These operations may bend the wire leads of the transistor to the point that proper handling of the transistor by automatic machinery is practically impossible, and even manual handling of the transistor is made difficult. Furthermore, a transistor with bent leads presents an unpleasing appearance. Therefore, transistors with bent leads are not as saleable as transistors with straight leads.

Prior art wire straighteners suffer from several disadvantages. Some of them require manual loading and operation. Others thereof apply tensioning or a burnishing action to the wires being straightened. Still others are not adapted to straighten several wires at the same time, or to straighten long wire leads, or to straighten wire leads close to the casing from which the leads emerge.

It is an object of this invention to provide an improved wire straightener which is not subject to the aforementioned and other disadvantages of known prior art wire straighteners.

It is a further object of this invention to provide an improved wire straightener that will straighten the several wire leads of a transistor at one operation.

A still further object of this invention is to provide an improved wire straightener that will straighten even the portions of the leads of a transistor that are close to the transistor casing.

Still a further object of this invention is to provide such an improved wire straightener that is easy to load and to operate, that applies no tension to the transistor leads during the straightening process, and that straightens a wire lead along the whole length thereof.

In accordance with this invention, the lead straightener may comprise an even plurality of sectoral blades, the circular edges of all the blades having the same radius of curvature. The circular edge of each blade is provided with a groove that is shaped to receive a transistor wire lead. The blades are each mounted for rotation about the center of curvature of the curved edge thereof, and they are arranged side-by-side in two groups, with the curved edges of the blades of one group respectively facing the curved edges of the blades of the other group. The distance between the axes of rotation of each pair of blades, comprising the facing blades in the two groups thereof, are all equal. However, the axes of rotation of one pair of blades is offset from the axes of rotation of another pair of blades through a distance determined by the offset between the wires to be straightened. One straight edge of each sectoral blade is radial or is close to and is parallel to a radius of the curved edge. Means are provided to move one group of blades towards the other group thereof, with all the straight radial edges in the same plane, until the grooved edges of the several pairs of blades are close enough to hold a wire tightly therebetween, and means are provided to rotate each blade about its individual axis in a direction such that the straight edges lead. The rolling action of the surfaces of the grooves on the leads straighten them.

Figure 2:
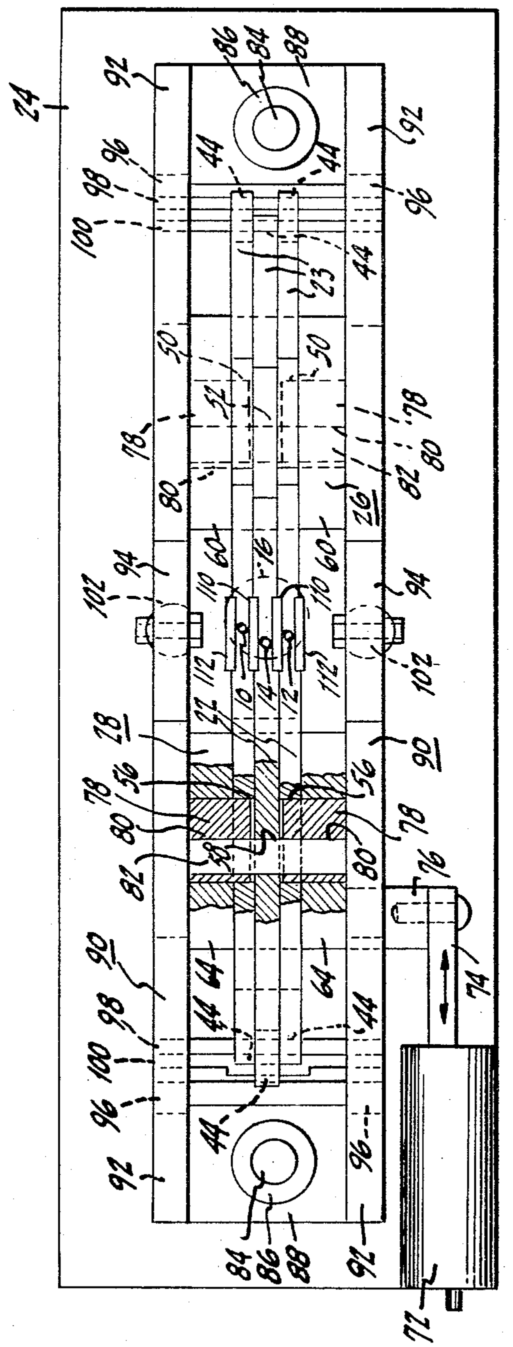
Figure 3:
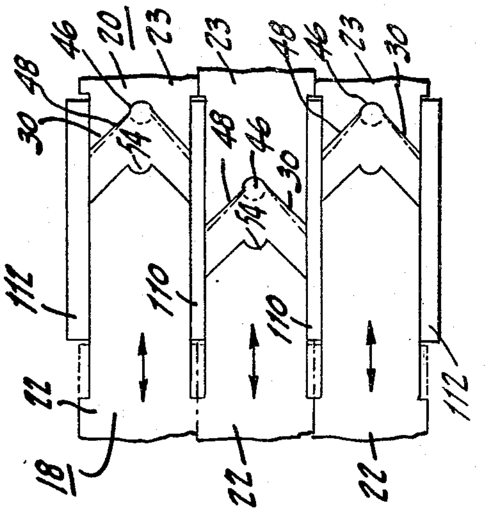
Figure 4:
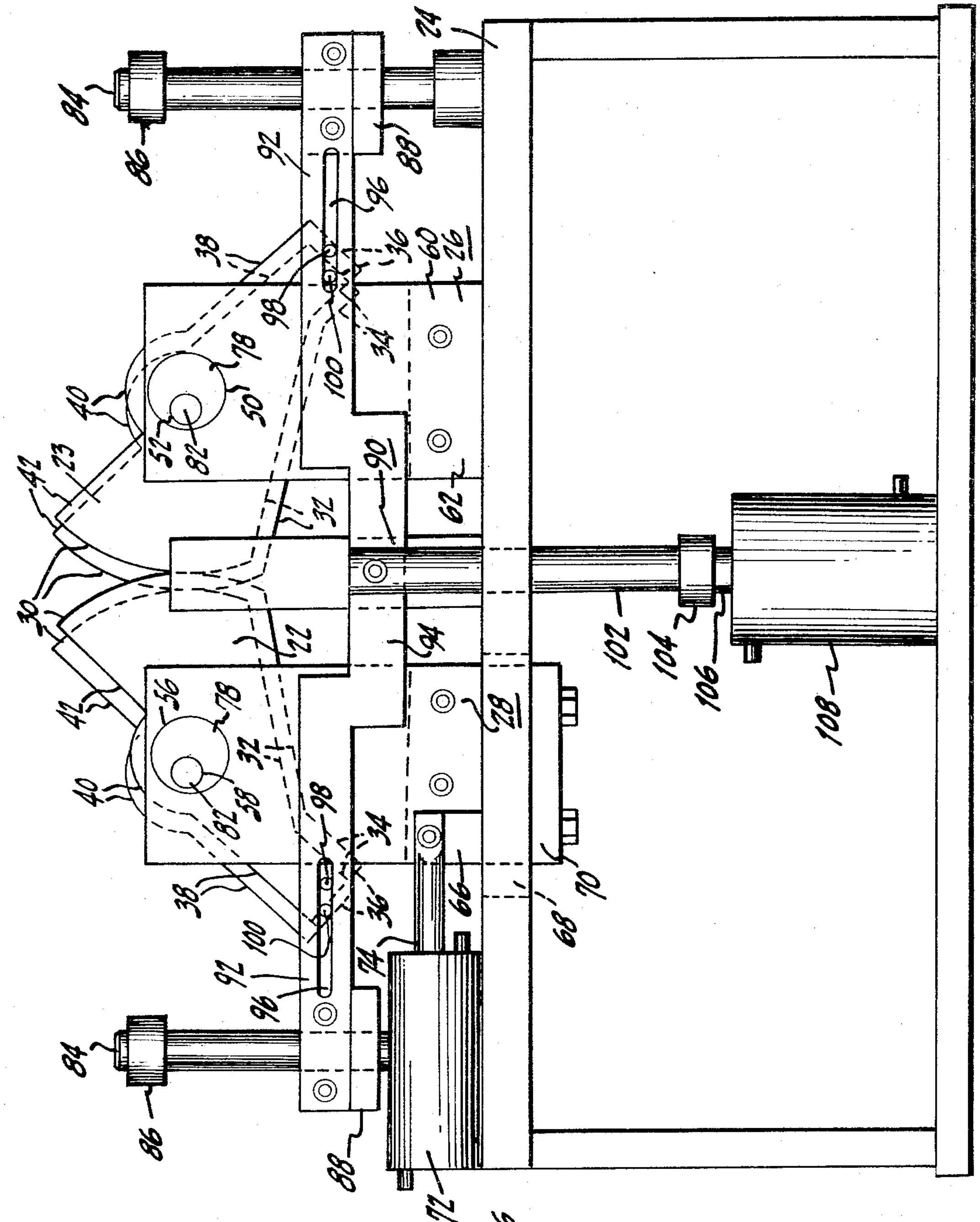
Figure 5:
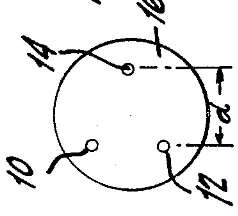

The novel features of this invention, both as to its organization and method of operation, as well as additional objects and advantages hereof, will be understood more readily from the following description when read in conjunction with the accompanying drawings, in which:

FIGURE 1 is a side elevational view of one form of transistor lead straightener according to this invention, FIGURE 2 is a plan view of the straightener of FIG. 1, parts thereof being broken away for clarity of illustration, FIGURE 3 is an enlarged plan view of a portion of the wire straightening blades and of the wire guides forming part of the straightener of FIG. 1, FIGURE 4 is a side elevational view of the straightener of FIG. 1 in an operating position thereof, and FIGURE 5 is a diagrammatic view of a transistor case and its leads, this view being used to illustrate the operation of the device of FIGS. 1 to 4.

Turning, first, to FIG. 5, there are shown wire leads 10, 12, and 14 extending from the bottom of a transistor casing 16. If a line is drawn through two of these leads 10 and 12, then the distance between this line and the third lead 14 may be considered to be the offset distance *d* between the various leads 10, 12, and 14.

A device for straightening all three leads of such a transistor in one operation is shown in FIGS. 1 to 4. This device comprises two groups 18 and 20 of sectoral, wire straightening blades 22 and 23. The right hand group 20 of sectoral lead straightening blades 23 (as viewed in FIGS. 1–4) is mounted on a supporting table top 24 by means of a stationary, right hand support 26; and the left hand group 18 of sectoral lead straightening blades 22 is mounted on the table top 24 by means of a movable left hand support 28. Each blade in the right group of blades is paired with a blade in the left group of blades in such a way that the paired blades are in the same plane. Also the circular edges of a cooperating pair of blades are matingly formed, as will be described more particularly hereinafter.

The blades 22 of the left group 18 are movable towards the blades 23 of the right group 20 to embrace the wire leads 10, 12, and 14 to be straightened between the adjacent edges of respective pairs of blades. Also, the blades in each group 18 and 20 are rotatable about their individual axes, whereby the wire leads are straightened by the action of the grooved edges of the blades 22 and 23 as they roll along the wire leads 10, 12, and 14.

In a device adapted to straighten the three wire leads 10, 12, and 14 of a transistor 16, such as that shown in FIG. 5, three pairs of blades divided into two groups 18 and 20 of three blades each are provided. More or fewer pairs of blades may be provided depending upon the number of leads to be straightened. The following description relates particularly to a device for straightening three leads.

As shown in FIGS. 1 and 4, each wire straightening blade 22 and 23 has a circular edge 30 and a second edge 32 extending from the circular edge 30 and forming an obtuse angle with the tangent to the circular edge 30 at the junction of the second edge 32 and the circular edge 30. A third edge 34 of each blade 22 or 23 extends at an obtuse angle with the second edge 32 and generally away from the curved edge 30. A fourth edge 36 extends at right angles to the third edge 34 and in a direction to make an obtuse angle with the line of the second edge 32 extended. A fifth edge 38 is parallel to the third edge 34 and extends generally towards the circular edge 30. The sixth edge 40 is also circular, centered on the center of the first edge 30, and extends from the fifth edge 38 to a seventh edge 42 which is radial, or close to and parallel to a radius of the circular first edge 30. The seventh edge 42 is parallel to the third and fifth edges 34 and 38 and meets the first edge 30. All the edges 32, 34, 36, 38, 40, and 42 of the blades 22 and 23 other than the first edge 30 may be perpendicular to the sides of the blades 22 and 23. A pin receiving hole 44 is provided in each of the blades 22 and 23 adjacent the fourth edge 36 thereof.

While the peripheral shape of all of the blades 22 and 23 is substantially identical, the blades 22 and 23 differ in several respects. The curved edge 30 of each of the righthand three blades 23 of the group 20 has a groove 46 (see FIG. 3) extending longitudinally along the edge 30 and centrally thereof. This groove 46 may be semi-circular in cross section where leads 10, 12, and 14 of circular cross-section are to be straightened. The remainder of the curved edge 30 of each blade 23 is formed to provide a V-shaped groove 48, the bottom or apex end of groove 48 being the circular groove 46 and the sides of the groove 48 extending at about 45° with respect to the sides of the blade 23. The two outer ones of the blades 23 of this group 20 also have a large shaft receiving hole 50 (best shown in FIG. 2) centered on the curved edges 30 and 40 of these blades, and the intermediate one of blade 23 of this group 20 has a smaller shaft receiving hole 52 centered on the curved edges 30 and 40 of the latter blade.

The three blades 22 comprising the left hand group 18 thereof are each provided with a centrally located groove 54 (see FIG. 3) extending longitudinally along the periphery of the curved edge 30. This groove 54 may also be circular in cross-section for straightening circular leads, but the groove 54 extends along an arc of less than a semi-circle. Extending laterally from each side of the groove 54 the curved edges 30 of the blades 22 are inclined, at an angle of about 138° with respect to the sides of the blades 22, and taper outwardly away from the groove 54 whereby the curved edge 30 is somewhat V-shaped in transverse cross-section with the groove 54 at the apex of the V. The purpose of the described shapes of the curved edges 30 of the blades 22 and 23 will appear hereinbelow. The two outer blades 22 are each provided with a large shaft receiving hole 56 (see FIGS. 1 and 2) centered on the curved edge 30 thereof, and the intermediate one of the blades 22 is provided with a smaller shaft receiving hole 58 centered on its curved edge 30.

The right hand support 26 includes a pair of spaced support plates 60 extending upwardly from the table top 24. The lower ends of the support plates 60 are fixed to a spacer 62 which is itself fixed to the table top 24. As will be more fully explained, the right hand group 20 of plates 23 is rotatably mounted near the top of the right hand support 26.

The left hand support 28 comprises a pair of spaced support plates 64 extending upwardly from the table top 24, respectively in line with the right hand support plates 60. The upper ends of the left hand support plates 64 rotationally support the left group 18 of blades 22. The lower ends of the plates 64 are fixed to and are spaced by a spacer 66 which extends through a slot 68 in the table top. A bearing member 70, the upper face of which contacts the lower surface of the table top 24, is fixed to the portion of the spacer 66 that extends into the slot 68. An air cylinder 72 is fixed to the table top 24 to the left of the left hand support 28 and the moving element 74 of the air cylinder 72 is fixed to the lower end of the support 28 through a further spacer 76. The left hand support 28 and the blades 22 carried thereby may be moved towards and away from the right hand support 26, and therefore towards and away from the right hand group of blades 23 carried thereby, by feeding air to one or the other ends of the air cylinder 72.

The two outer blades 22 in the group 18 thereof may be mounted to rotate about a common axis, and the corresponding two blades 23 of the other group of blades 20 may be mounted to rotate about another axis which is parallel to and spaced from the first axis. An outer blade 22 of the group 18 and a facing outer blade 23 of the other group of blades 20 comprise a pair of blades. Therefore these four blades comprise two pairs of blades, each pair of blades serving to straighten one of the two in-line leads 10 and 12 of the transistor. The blades of a third or intermediate pair that serve to straighten the offset lead 14 are positioned between the outer pairs of blades and are so mounted that they rotate about axes that are offset, respectively, from the axes of the outer blades in their respective groups by the offset distance *d*. The means for so mounting the blades is best shown in FIG. 2 in which short shafts 78 of a size to respectively rotationally fit the large holes 50 and 56 in the blades 23 and 22 are fixed in the respective plates 60 and 64 of the stationary and the movable supports 26 and 28. These short shafts 78 extend through their respective plates 60 and 64 and overhang (see FIG. 2) them inwardly of the supports 26 and 28 for a distance less then the thickness of the blades 23 and 22. The short shafts 78 in the supports 26 and 28 are axially aligned, as shown in FIG. 2.

A blade 23 or 22 in each group of blades having a large shaft receiving hole 50 or 56 therethrough is rotatably mounted on the overhanging portion of each large shaft 78. A bore 80 is provided through both of the large shafts 78 in each support 26 and 28 in such a manner that a smaller diameter shaft 82 may be received in each of these bores 80. The diameter of this smaller diameter shaft 82 is such that it rotationally fits the hole in the intermediate blades 22 and 23 of each group of blades. In each support, the axis of the smaller diameter shaft 82 is offset to the left, as viewed in FIGS. 1, 2, and 4, from the axis of the aligned, large shafts 78 a distance equal to the offset distance *d* of FIG. 5.

The means for rotating the mounted blades about their respective centers comprises a pair of guide rods 84 mounted on the table top in line with the supports 26 and 28, the supports 26 and 28 being positioned between the guide rods 84. If desired, a collar 86 may be fixed to the top of each rod 84. A slide block 88 slidably fits each rod 84. Two bridge members 90 extend between and are fixed to opposite sides of the slide blocks 88. Each bridge member 90 comprises two aligned, horizontally disposed, relatively higher, outer or end portions 92 and a lower, integral, horizontal, central portion 94. Space is provided between the adjacent edges of the portions 92 to facilitate loading the wire straightener and to facilitate observation of the operation thereof. Slots 96 are provided in each of the portions 92 of each bridge member 90 between the blocks 88 and the supports 26 and 28. The two slots 96 to the right of the support 26 are aligned with each other as are the slots to the left of support 28. A pin 98 extends through the pin receiving holes 44 in the outside blades of each group of blades 18 and 20 and through the slots 96. Another pin 100 extends through the pin receiving holes 44 in the intermediate blades of each group of blades 18 and 20 and through the slots 96. These other pins 100 are offset to the left, as viewed in the several figures, from the pins 98 the same distance *d*, as are the axes of the small shafts 82 from the axes of the large diameter shafts 78. Rods 102, which are mounted for sliding through the table top 24, are fixed to the central portions 94 of the bridge members 90. The rods 102 are fastened together below the table by means of a cross head 104 fixed to the moving element 106 of a vertically positioned air cylinder 108, whereby the bridge members 90 may be moved up or down, and the blades 22 and 23 may be rotated about their respective axes of rotation by cooperation of the pins 98 and 100 with the blades 22 and 23 and with the slots 96 in the bridge members 90. For clarity of illustration, the crosshead 104, the element 106 and the cylinder 108 are not shown in FIG. 2.

To avoid interference of the pins 98 and 100 with the motion of the several blades and with each other the interfering portions of the blades 22 and 23 and of the pins 98 and 100 may be cut away in a known manner. In the highest position of the bridge members 90, the substantially radial edges 42 of the several blades 22 and 23 are all in the same plane, as shown in FIG. 1.

Guide plates 110 and 112 may be provided for confining wire leads to be straightened between the curved edges of a pair of blades 22 and 23 when the blades are separated. To provide space and operational clearance for these guide plates 110 and 112, the sides of the blades 22 and 23 may be cut away as shown in FIG. 3. The two inner guide plates 110 may be thinner than the outer two guide plates 112 if desired.

In the operation of the above described apparatus, air is so admitted to the air cylinders 72 and 108 that the bridge members 90 are at their top position and the movable support 28 is at its extreme left position as viewed in the several figures. The blades 22 and 23 and the supports 26 and 28 take the position shown in FIG. 1. This position of the blades is shown in solid lines in FIG. 3. A transistor 16 is then so placed that its three leads 10, 12, and 14, at the points where they exit from the transistor casing 16 (or where they are fixed to the casing 16), are in contact with the semi-circular grooves 46 in the stationary group 20 of blades 23. At the stated position of the blades 22 and 23, their upper edges 42 are all in the same plane. Hence, the bottom of the transistor casing 16 contacts the top of the blades 22 and 23, and the portions of the lead wires 10, 12, and 14 very close to the casing are in contact with the curved edges 30 of the right or stationary group of blades 23. Even though the remainder of the leads 10, 12, and 14 may be bent and therefore require straightening, the portion of the leads 10, 12, and 14 that are close to the casing are in position to be received in the cooperating grooves 46 and 54 in the curved edges 30 of the pairs of blades 22 and 23. The lower parts of the blades, as viewed in FIGS. 1, 3, and 4, curve away from the wire leads. This position of the blades is shown in FIG. 2, the transistor being indicated by the dotted circle 16. Air is then admitted to the air cylinder 72 to cause motion of the left hand support 28 towards the right, thereby grasping the portion of the wire leads 10, 12, and 14 that are near the casing in between the upper portion (as viewed in FIG. 1) of the grooved edges 46 and 54 of a cooperating pair of plates 22 and 23. The position of the movable blades 22, when close to the stationary blades 23, is shown in dotted lines in FIG. 3. As pointed out above, the grooves 54 in the movable blades 22 are less than a semi-circle in extent and the angle between the cut-way edge portions of the moving blades 22 adjacent the grooves 54 is less than the angle between the sides 48 of the V grooves in the stationary blades 23, whereby pressure of the blades in a direction towards each other is on the wire 10, 12, and 14 and not directly on the blades 22 and 23. Due to the offset of the middle pair of blades 22 and 23 with respect to the outer pairs of blades, the pressure applied to all three of the leads 10, 12, and 14 of the transistor applies no shearing force to any lead wire. Then, the air is admitted to the cylinder 108 so that the bridges 90 are drawn downwardly. As the bridges 90 go down, the contact of the pins 98 and 100 on the tops of the slots 96 causes each blade 22 and 23 to rotate about its own axis, the left group 18 rotating counter-clockwise and the right group 20 rotating clockwise, whereby the grooved edges 46 and 54 of the blades 23 and 22 roll along the wires and apply straightening pressure to the individual wires. FIG. 4 shows the position of the bridges 90 and of the blades 22 and 23 near the end of the straightening stroke of the blades. Since the rate of rolling action applied to each wire is the same in each case, the wires are neither stretched nor bowed, nor is longitudinal frictional force applied to the leads, whereby they are not distorted by this straightening action. Since the length of the grooves may be as long as the leads, the leads may be straightened throughout their whole lengths.

Although only a single wire straightener has been shown and described, it will undoubtedly be apparent to those skilled in the art that variations thereof are possible within the spirit of the present invention. For example, a shoulder may be built into the grooves of all the blades in one group thereof to cut a lead at a predetermined length as the lead is being straightened; or a greater or lesser number of pairs of blades may be provided in case more or fewer wires are to be straightened. The further offset of the axes of rotation of additional pairs of blades that may be necessary when further wires are to be straightened may be provided by making the diameter of each offset shaft, such as shafts 82, greater than shown, by shortening them until they extend from their respective, large diameter shafts through only one blade, and by providing still smaller diameter shafts extending through the modified shaft 82 along a further offset axis and into a further blade, whereby two offset axes are provided. Still further offsets can be provided in a similar manner. This wire straightener may be modified for faster feeding by mounting a plurality of groups of blades, such as those of the right hand group, on a turret, by loading each group of blades at a loading position of the turret, and by indexing the turret so that the loaded blades may cooperate with another group of blades, such as the left hand group, to straighten the leads of the transistor that had been loaded at the loading position. With such an arrangement, a pair of spring fingers may be provided to hold the transistor in position on the indexing blades. Also, if desired, the straightening machine may be turned upside down from the position shown and fed from an automatic feeding and orienting device. Furthermore, the rotating force may be applied to the blades between their centers of rotation and their grooved edges instead of as shown. Hence, it is desired that the foregoing description be considered as illustrative and not in a limiting sense.

What is claimed is:

1. A lead wire straightening device comprising
(a) a pair of blades, each blade having a circular edge formed with a longitudinal groove of a cross section to fit a portion of the surface of a wire to be straightened,
(b) means for mounting one of said blades for motion towards the other thereof,
(c) means for mounting said blades for rotation about respective, parallel, spaced axes with their grooved edges facing each other,
(d) means for moving one of said blades towards the other thereof to the point where said grooves are in wire gripping position, and
(e) means for so rotating said blades about their respective axes as to provide the same rate of linear motion of their circular edges.

2. A lead wire straightening device comprising
(a) a pair of blades, each blade having a circular edge formed with a longitudinal groove of a cross section to fit a portion of the surface of a wire to be straightened,
(b) each blade having a substantially radial edge joining said circular edge,
(c) means for mounting one of said blades for motion towards the other thereof,
(d) means for mounting said blades for rotation about respective, parallel, spaced axes with their grooved edges facing each other,
(e) means for moving one of said blades towards the other end thereof to the point where said grooves are in wire gripping position, and
(f) means for so rotating said blades about their respective axes so as to provide the same rate of linear motion of their circular edges, said blades being so mounted that said radial edges are in the same plane in one rotational position of said blades.

3. A lead wire straightening device comprising
(a) a pair of blades, each blade having a circular edge formed with a longitudinal groove of a cross section to fit a portion of the surface of a wire to be straightened, (b) the circular edge of one of said blades laterally beyond the longitudinal groove therein being shaped to provide a V-shaped transverse cross-section, and the circular edges of the other blades laterally beyond the longitudinal groove therein being shaped to provide a V-shaped groove therein, the angle between the sides of the V-shaped groove being greater than the angle between the sides of the V-shaped cross-section, (c) each blade having a substantially radial edge joining said circular edge, (d) means for mounting one of said blades for motion towards the other thereof, (e) means for mounting said blades for rotation about respective parallel spaced axes with their circular edges facing each other, (f) means for moving one of said blades towards the other thereof to the point where said wire fitting grooves are in wire gripping position, and (g) means for so rotating said blades about their respective axes as to provide the same rate of motion of their circular edges, said blades being so mounted that said radial edges are in the same plane in one rotational position of said blades.

4. A lead wire straightener comprising (a) a plurality of pairs of blades, each blade having a circular edge formed with a longitudinal groove of a cross section to fit a portion of the surface of a wire to be straightened, (b) means for mounting one blade of each pair of blades for movement towards the other blade of its respective pair of blades, (c) means for mounting the blades of one pair of blades for rotation about respective parallel spaced axes with their grooved edges facing each other, (d) means for mounting each blade of a second pair of blades for rotation about respective parallel spaced axes with their grooved edges facing each other, the second mentioned parallel spaced axes being parallel to and offset from said first mentioned parallel spaced axes, (e) means for moving a blade of each pair of blades towards the respective other blade of the pairs thereof to the point where the grooved portions attain a wire holding position, and (f) means for so rotating each of said blades about its respective axis to provide the same rate of linear motion of the several edges.

5. A lead wire straightener comprising (a) a plurality of pairs of blades, each blade having a circular edge formed with a longitudinal groove of a cross section to fit a portion of the surface of a wire to be straightened, (b) means for mounting one blade of each pair of blades for movement towards the other blade of its respective pair of blades, (c) each of said blades having a substantially radial edge extending from the circular edge thereof, (d) means for mounting the blades of one pair of blades for rotation about respective parallel spaced axes with their grooved edges facing each other, (e) means for mounting each blade of a second pair of blades for rotation about respective parallel spaced axes with their grooved edges facing each other, the second mentioned parallel spaced axes being parallel to and offset from said first mentioned parallel spaced axes, (f) means for moving a blade of each pair of blades towards the respective other blade of the said pair of blades to the point where the grooved portions attain a wire holding position, and (g) means for rotating each of said blades about its respective axis as to provide the same rate of linear motion of the several edges, said substantially radial edges all being in one plane at one rotational position of said blades.

6. A lead wire straightener comprising (a) a plurality of pairs of blades, each blade having a circular edge formed with a longitudinal groove of a cross section to fit a portion of the surface of a wire to be straightened, (b) means for mounting one blade of each pair of blades for movement towards the other blades of its respective pair of blades, (c) each of said blades having a substantially radial edge extending from the circular edge thereof, (d) means for mounting the blades of one pair of blades for rotation about respective parallel spaced axes with their grooved edges extending towards each other, (e) means for mounting each blade of a second pair of blades for rotation about respective parallel spaced axes with their grooved edges extending towards each other, the second mentioned parallel spaced axes being parallel to and offset from said first mentioned parallel spaced axes, (f) means for moving one blade of each pair of blades towards the respective other blade of the said pair of blades to the point where the grooved portions attain a wire holding position, (g) the circular edge of said movable blades laterally beyond the longitudinal grooves therein being shaped to provide a V-shaped transverse cross-section, and the circular edges of the other blades laterally beyond the longitudinal groove therein being shaped to provide a V-shaped groove therein, the angle between the sides of the V-shaped groove being greater than the angle between the sides of the V-shaped group section, (h) means for so rotating each of said blades about its respective axis as to provide the same rate of motion of the several edge, said substantially radial edges all being in one plane at one rotational position of said blades.

7. A lead straightener device comprising (a) a plurality of groups of blades, each blade having a circular edge formed with a longitudinal groove of a shape to fit a portion of a surface of a wire to be straightened, (b) means for mounting the blades of and groups thereof for movement towards the blades of the other group thereof, (c) a blade in one group being mounted for rotation about a first axis, (d) a second blade in said one group being mounted for rotation about a second axis parallel to said first axis but offset therefrom, (e) a blade in said second group being mounted for rotation about a third axis spaced from and parallel to said first axis and with the groove in said blade in said second group facing the groove in said blade in said first group, (f) a second blade in said second group being mounted for rotation about a fourth axis spaced from and parallel to said second axis and with the groove in said second blades of said first and second groups facing each other, the distance between said first and third axis being the same as the distance between said second and fourth axis, (g) means for moving one group of blades towards the other group of blades to the point where said grooved portions of said circular edges attain a wire gripping position, and (h) means for so rotating said blades about their respective axes that the circular edges of all the blades move at the same linear rate.

8. A lead straightener device comprising (a) a plurality of groups of blades, each blade having a circular edge formed with a longitudinal groove of a shape to fit a portion of a surface of a wire to be straightened, (b) means for mounting the blades of one group thereof for movement towards the blades of the other group thereof, (c) a blade in one group being mounted for rotation about a first axis, (d) a second blade in said one group being mounted for rotation about a second axis parallel to said first axis but offset therefrom, (e) a blade in said second group being mounted for rotation about a third axis spaced from and parallel to said first axis and with the groove in said blade in said second group facing the groove in said blade in said first group, (f) a second blade in said second group being mounted for rotation about a fourth axis spaced from and parallel to said second mentioned axis and with the groove in said second blades of said first and second groups facing each other, the distance between said first and third axis being the same as the distance between said second and fourth axis, (g) means for moving one group of blades towards the other group of blades to the point where said grooved portions of said circular edges attain a wire gripping position, and (h) means for so rotating said blades about their respective axes that the circular edges of all the blades move at the same linear rate, each of said blades having a radial edge joined to the circular edge thereof, said blades being so arranged that at one rotary position thereof, all of said radial edges are in the same plane.

9. A lead straightener device comprising (a) a plurality of groups of blades, each blade having a circular edge formed with a longitudinal groove of a shape to fit a portion of a surface of a wire to be straightened, (b) means for mounting the blades of one group thereof for movement towards the blades of the other group thereof, (c) a blade in one group being mounted for rotation about a first axis, (d) a second blade in said one group being mounted for rotation about a second axis parallel to said first axis but offset therefrom, (e) a blade in said second group being mounted for rotation about a third axis spaced from and parallel to said first axis and with the groove in said blade in said second group facing the groove in said blade in said first group, (f) a second blade in said second group being mounted for rotation about a fourth axis spaced from and parallel to said second axis and with the groove in said second blades of said first and second groups facing each other, the distance between said first and third axis being the same as the distance between said second and fourth axis, (g) each of said blades having a radial edge joined to the circular edge thereof, said blades being so arranged that at one rotary position thereof, all of said radial edges are in the same plane, (h) means for moving one group of blades towards the other group of blades to the point where said grooved portions of said circular edges attain a wire gripping position, (i) the circular edge of said movable blades laterally beyond the longitudinal grooves therein being shaped to provide a V-shaped cross-section, and the circular edges of the other blades laterally beyond the longitudinal groove therein being shaped to provide a V-shaped groove therein, the angle between the sides of the V-shaped groove being greater than the angle between the sides of the V-shaped cross-section, and (j) means for so rotating said blades about their respective axes that the circular edges of all the blades move at the same linear rate.

References Cited by the Examiner

UNITED STATES PATENTS

| | | | |
|---|---|---|---|
| 2,878,841 | 8/1954 | Peterson et al. | 140—147 |
| 2,935,097 | 5/1960 | Wohlman | 140—147 |
| 3,002,539 | 10/1961 | Rus | 140—147 |
| 3,071,166 | 1/1963 | Gutbier | 140—1 |
| 3,220,444 | 11/1965 | Zimmerman et al. | 140—147 |

OTHER REFERENCES

R. D. Essert: "Transistor Lead Straightener," August 1959, pp. 28–29 (IBM Technical Disclosure Bulletin).

CHARLES W. LANHAM, *Primary Examiner.*

E. M. COMBS, *Assistant Examiner.*